(No Model.)
J. A. H. MARTY.
ANIMAL TRAP.
No. 290,082.  Patented Dec. 11, 1883.
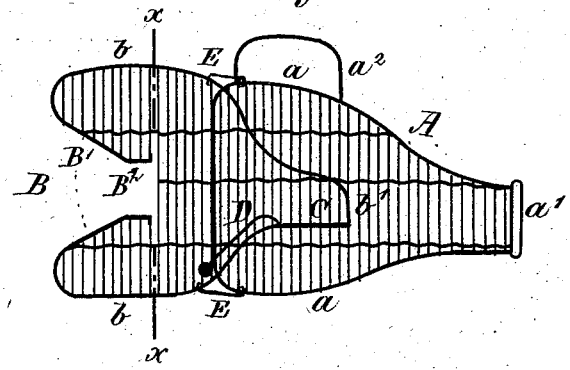
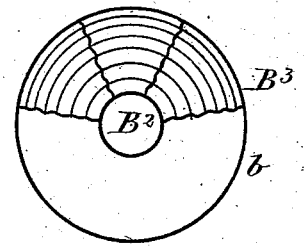
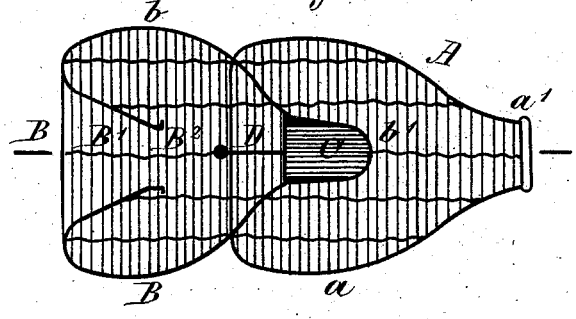
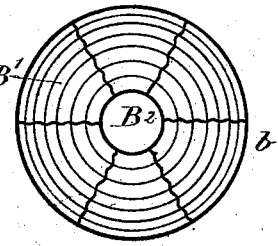
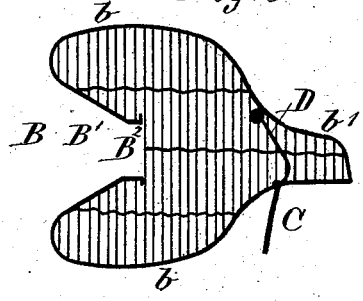
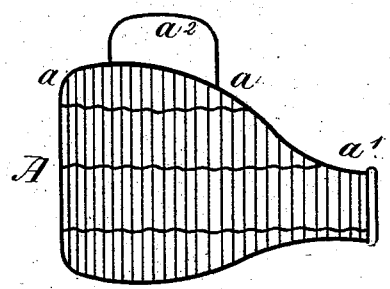
Witnesses
William S. Boulter
J. W. Reynolds
Inventor
Jean A. H. Marty
pr Henry Orth
his att'y

UNITED STATES PATENT OFFICE.

JEAN ANTOINE HENRI MARTY, OF VILLEFRANCHE, FRANCE.

ANIMAL-TRAP.

SPECIFICATION forming part of Letters Patent No. 290,082, dated December 11, 1883.

Application filed May 1, 1883. (No model.) Patented in France August 9, 1882, No. 152,243.

*To all whom it may concern:*

Be it known that I, JEAN ANTOINE HENRI MARTY, a citizen of the French Republic, residing at Villefranche, in the French Republic, have invented certain new and useful Improvements in Self-Setting Traps, (for which I have obtained Letters Patent in France, No. 152,243, dated August 9, 1882;) and I do hereby declare the following to be a full, clear, and exact description of the inventon, such as will enable others skilled in the art to which it appertains to make and use the same, reference being had to the accompanying drawings, and to the letters of reference marked thereon, which form a part of this specification.

This invention relates to improvements in self-setting traps; and it consists in the details of construction and arrangement of parts thereof, substantially as hereinafter described, and shown in the accompanying drawings, in which—

Figure 1 is a vertical longitudinal section of the trap; Fig. 2, a like horizontal section; Fig. 3, a section taken on line $x$ $x$ of Fig. 1; Fig. 4, an elevation or front view of the trap. Fig. 5 is a longitudinal vertical section of the entrance-section of the trap, and Fig. 6 is a like view of the cage or chamber section thereof.

This trap is made entirely of wire, and is composed of two parts—the cage or chamber A, of the form substantially as shown, with an enlarged part or body, $a$, and a contracted neck, $a'$, closed by means of a suitable gate, (not shown,) through which the animal caught is removed. The section A is open at its enlarged end $a$, and provided with a handle, $a^2$.

B is the entrance-section of the trap, of substantially the shape shown, and approximately of the same shape as section A, having the enlarged portion or body $b$ and a contracted neck, $b'$. The outer end of section B has a funnel-shaped entrance, B', re-entering the body $b$ of the section and terminating in a narrow orifice, $B^2$, as shown. At the orifice $B^2$ is a partition, $B^3$, Fig. 3, that closes one-half (more or less) of the interior space formed by the re-entering funnel-shaped mouth or entrance B', said closure being, when the trap is set in position, as shown in Figs. 1 and 5, above the entrance B.

In the bottom of the neck $b'$ of the section B is arranged a trap or gate consisting of a plate, C, pivoted to said neck in any convenient manner and opening downwardly. The plate or platform C has a weighted arm, D, the weight of which is just sufficient to carry the plate back into its normal position to close the opening in the neck after having been depressed.

As shown in Figs. 1 and 2, the contracted neck $b'$ of section B is adapted to be inserted into the enlarged end of section A, and is made fast thereto by wire hooks pivoted to either the section A or B, as described. (Shown in Fig. 1.) The connecting-wires E are pivoted to section A and adapted to be hooked over the wires of section B.

The trap being baited by placing or suspending any suitable bait in section A, the neck of section B is then inserted into the former and the two connected together or fastened together by the wires E. The animal, allured by the bait, will soon find the entrance and endeavor to reach said bait. As soon, however, as it reaches the fall or plate C, the latter will give way under its weight, and the animal will drop into the cage A. Said plate, closing immediately, prevents its escape, while the trap is again set for another. Should the animal not at once drop into section A, but retreat on finding the fall give way, it will become frightened and at once seek to escape, climbing along the wires of the top of the trap. It will then encounter the partition $B^3$, and, finding its egress stopped, will become bewildered, and, its fears increasing, it will run or climb back the way it came, and, lighting on the trap or fall C, will be precipitated into the cage A, as above described.

It will be seen that there is a considerable space between the fall or trap C and the entrance-orifice $B^2$; hence the animal to reach the same would have to run around the trap and climb along the funnel-shaped re-entering mouth thereof if egress is sought by the lower half of the trap, while, as above set forth, it climbs along the upper half, its progress is stopped by the partition $B^3$.

Experience has demonstrated that rodents, or animals for which this trap is especially designed, seldom take a downward course when trying to escape from what their instinct teaches them to be a danger, but will always go upward or away from the support upon which the trap may stand, and for this reason I employ a segmental partition only, extending around the upper half (more or less) of the entrance-orifice. The sections are more or less flattened at the point of contact with their support to prevent their being turned by the animal within either of them, whereby the fall or trap C may become inoperative. It is also obvious that such a trap may be readily disinfected from the scent left by an animal, which is necessary if the trap is to be used for any length of time, as it is well known that animals will not enter a trap in which they can detect their own scent.

Having thus described my invention, what I claim is—

1. A self-setting trap consisting of the sections A and B, in combination with the trap-door or fall C and the partition $B^3$, all constructed and operating substantially as and for the purposes specified.

2. A self-setting trap consisting of a bottle-shaped section, A, the mouth of the neck of which is closed by a gate, and the body open at its end, in combination with an approximately like-shaped detachable section, B, having the re-entering funnel-shaped entrance B' $B^2$, the closed neck $b'$, the partition $B^3$, and the weighted trap-door or fall C, all constructed and arranged to operate substantially as and for the purposes specified.

In testimony that I claim the foregoing I have hereunto set my hand this 31st day of March, 1883.

JEAN ANTOINE HENRI MARTY.

Witnesses:
EMILE KANTER,
LOUIS COUSSOIND.